(12) United States Patent
Arita et al.

(10) Patent No.: US 7,197,742 B2
(45) Date of Patent: Mar. 27, 2007

(54) SOFTWARE MODULE FOR INTEGRATION

(75) Inventors: Hiroshi Arita, Kobe (JP); Akira Ikezoe, Kobe (JP); Kiyoshi Yagi, Kobe (JP); Minoru Takahashi, Kobe (JP); Takeshi Fukazawa, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 597 days.

(21) Appl. No.: 10/258,304

(22) PCT Filed: Feb. 7, 2002

(86) PCT No.: PCT/JP02/01050

§ 371 (c)(1),
(2), (4) Date: Oct. 23, 2002

(87) PCT Pub. No.: WO02/063468

PCT Pub. Date: Aug. 15, 2002

(65) Prior Publication Data

US 2003/0106044 A1   Jun. 5, 2003

(30) Foreign Application Priority Data

Feb. 7, 2001   (JP) .............................. 2001-31522

(51) Int. Cl.
G06F 9/44 (2006.01)
G06F 9/45 (2006.01)
(52) U.S. Cl. .................. 717/120; 717/101; 717/121
(58) Field of Classification Search ........ 717/120–123, 717/168–172, 101–104, 114–116
See application file for complete search history.

(56) References Cited

U.S. PATENT DOCUMENTS 5,752,039 A * 5/1998 Tanimura .................... 717/168

6,016,394 A * 1/2000 Walker ....................... 717/104

(Continued)

FOREIGN PATENT DOCUMENTS

JP    2000-148221 A    5/2000

(Continued)

OTHER PUBLICATIONS

Niz et al, "Time weaver: A software through models framework for embaded real time systems", ACM LCTES pp. 133-143, 2003.*

(Continued)

*Primary Examiner*—Anil Khatri
(74) *Attorney, Agent, or Firm*—Christie, Parker & Hale, LLP.

(57) ABSTRACT

The present invention relates to a software module, and, especially, relates to a software module for integration having severe restriction on the available memory amount and the real-time operation, and provides a software module for integration having increased inheritance in software. This is a software module for integration, integrated as a software module within a device to control the device. The software module has a public module for updating a public data value, an intermediate module for converting the data value in a predetermined data format updated in the public module into a data value in a predetermined data format adaptable to a referencing side, and a referencing module for referencing the data value in a predetermined data format converted by the intermediate module. The publication and referencing process can be implemented among the modules.

9 Claims, 5 Drawing Sheets

U.S. PATENT DOCUMENTS

| | | | |
|---|---|---|---|
| 6,324,619 B1 * | 11/2001 | Raverdy et al. | 717/120 |
| 6,347,396 B1 * | 2/2002 | Gard et al. | 717/168 |
| 6,374,161 B1 | 4/2002 | Iwai et al. | |
| 6,405,364 B1 * | 6/2002 | Bowman-Amuah | 717/101 |
| 6,463,583 B1 * | 10/2002 | Hammond | 717/162 |
| 6,567,977 B1 * | 5/2003 | Kumar | 717/174 |
| 6,598,224 B1 * | 7/2003 | Maeda et al. | 717/174 |
| 6,629,315 B1 * | 9/2003 | Naylor | 717/168 |
| 6,662,357 B1 * | 12/2003 | Bowman-Amuah | 717/120 |
| 6,704,743 B1 * | 3/2004 | Martin | 707/103 R |
| 7,096,465 B1 * | 8/2006 | Dardinski et al. | 717/178 |

FOREIGN PATENT DOCUMENTS

JP    2000-310152 A    11/2000

OTHER PUBLICATIONS

Hood et al, "Efficient recompilation of modeul interface ina sofwtare development environment", ACM pp. 180-189, 1986.*

Wang et al, "An architecture for embaded software integration using resuable components", ACM CASE, pp. 110-118, 2000.*

International Search Report of PCT/JP02/01050, dated May 28, 2002.

Patent Abstract of Japan, Publication No. 2000148221 A, Published May 26, 2000, in the name of Yamagata Casio Co Ltd.

Patent Abstract of Japan, Publication No. 2000310152 A, Published Nov. 11, 2000, in the name of Denso Corp.

* cited by examiner

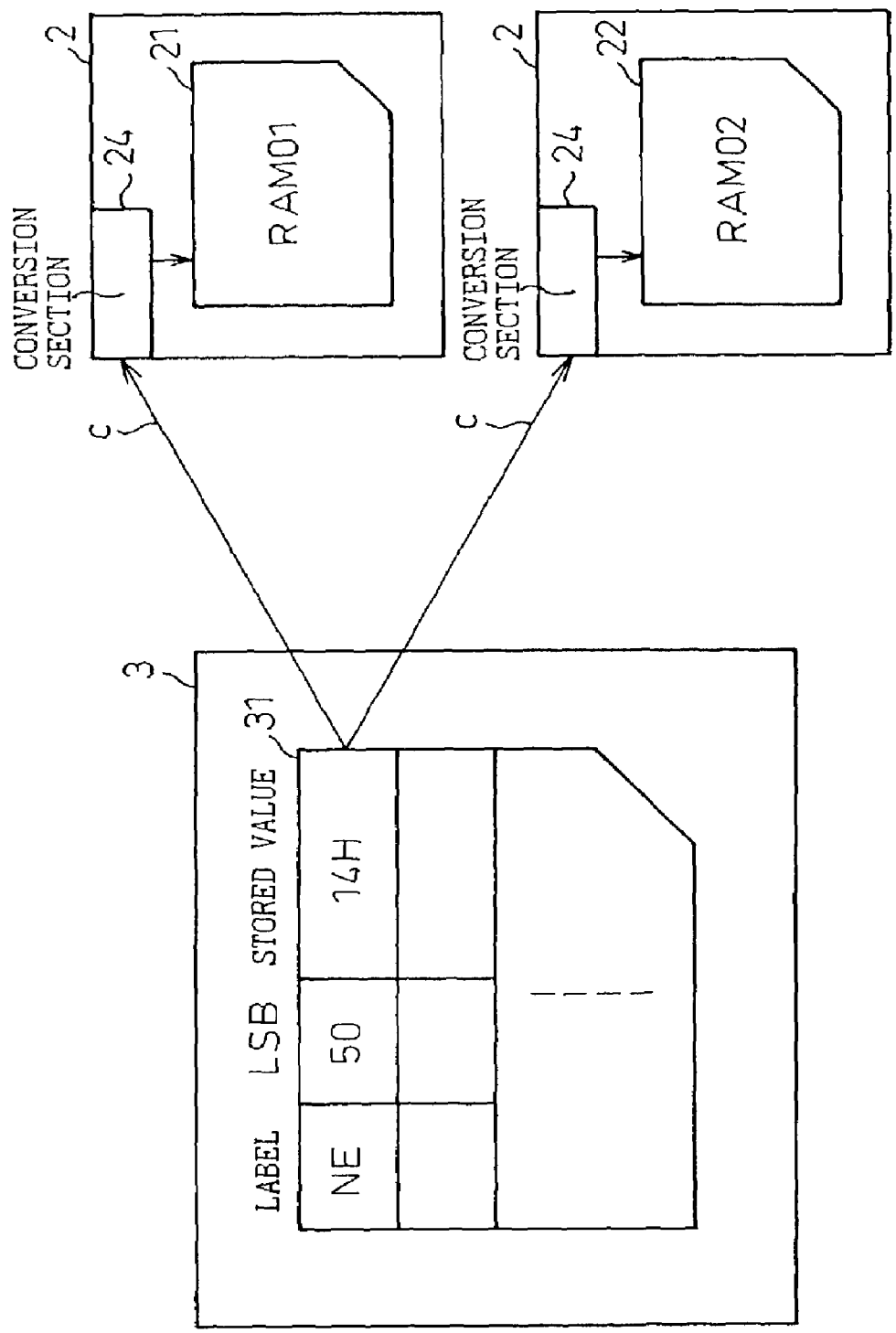

SOFTWARE MODULE FOR INTEGRATION

CROSS-REFERENCE TO RELATED APPLICATION

This application is a National Phase Patent Application of International Application Number PCT/JP02/01050, filed on Feb. 7, 2002, which claims priority of Japanese Patent Application Number 2001-31522, filed Feb. 7, 2001.

TECHNICAL FIELD

The present invention relates to a software module, and especially to a software module for integration, which is integrated in a control device, or the like, located inside a vehicle and which has severe restrictions in terms of the available memory amount and the real-time operation, or the like.

BACKGROUND ART

In recent years, microprocessors have been used for controlling various equipment in many fields from audio devices to industrial machines. With regard to a microprocessor used for integration for controlling specific equipment, such as a one-chip type microcomputer, it has been desired to make full use of a memory resource which is strictly limited due to a demand for realizing small and low-cost equipment.

FIG. 1 shows a constitutional example of data publication/referencing between conventional software modules integrated within an EFI-ECU (Electronic Fuel Injection-Electronic Control Unit), which is a system for electronically controlling fuel injection in a vehicle.

In FIG. 1, a public module 1 is a software module which operates for updating a data in a predetermined RAM (Random Access Memory) area (public file RAM 11, in the present example). The data in RAM 11 is available to be referenced by other software modules. On the other hand, a referencing module 2 is a software module which operates based on a data obtained by referring a data in the public file RAM 11 or by copying the data to its own file RAM 21 to 23.

There exist various ECUs such as EFI, ABS, security (body), etc. ECUs, within a vehicle. Each ECU has integrated therein a CPU or the like, which is necessary for control (for example, for controlling injection). In a software module library (firmware) integrated in an one-chip CPU circuit, or the like, within the EFI-ECU, the side which updates a data in a predetermined file is called a public module 1, and the side which operates by referring the updated data is called a referencing module 2.

FIG. 1 shows an example of a data structure of a conventional public file RAM 11. In the case of an EFI-ECU, there exist various public data such as the number of rotations of the engine, the water temperature and intake temperature, etc. The present example shows an example of the number of rotations of the engine (NE). When the pubic module 1 detects the current number of rotations of the engine of 1000 rpm, the number is replaced by 1 byte of hexadecimal data (14 Hex) to update the public file 11, due to the demand for saving memory.

In the above-mentioned example, the LSB (Least Significant Bit) of 1 byte data is previously assigned a predetermined default value, for example, LSB=50 rpm, etc., by a designer. Conventionally, each software module is developed and designed and has such a default LSB value as a precondition.

However, if, for example, the default LBS value is changed from 50 to 20 because of a design change or the like, all corresponding referencing modules 2 must be changed. This is a large problem in the point of inheritance of software, including verifying operations of the software after the change.

In the example of FIG. 1, it is necessary to change the processes, of all referencing modules 2, from a process using LSB=50 to one using LSB=20. Also, because software developers must be aware of the LSB value at the side of the public module 1 when designing and developing a software, a load is put on the developers for developing a new software at the time of updating the product, or the like.

Further, when a data with an integer value is changed to decimal notation, so as to be processed with higher accuracy, in response to the request from a user, etc., 4 bytes of the floating-point data is needed in addition to the 1 byte of the integer data. Then, the small memory resource available to the integrated circuit is further consumed.

DISCLOSURE OF THE INVENTION

Considering the above mentioned problems, the object of the present invention is to increase logic and inheritance in processing existing or newly developed integrated modules and to achieve more effective software design and development, by excluding the concept of "LSB" which conventionally defined, artificially and implicitly, a data value transmitted or received between the public module and the referencing module, and by providing an intermediate module to solve a mismatch between data transmitted or received between each module.

More concretely, in the present invention, actual physical data value is used instead of LSB, and the intermediate module for bringing the data into correspondence with the existing public module and referencing module is used; or, the LSB value for defining the value is included in a data, and the intermediate module is used to bring the data into correspondence with the existing public module and referencing module. The object of the present invention resides in designing and developing software more effectively by increasing the inheritance between integrated modules in each product.

In order to attain the above object, it is also an object to achieve reduced consumption and effective use of memory resources demanded for the integrated module.

According to the present invention, there is provided a software module for integration, integrated as a software module within a device to control the device, which has a public module for updating a public data value, an intermediate module for converting a data value in a predetermined data format updated in the public module into a data value in a predetermined data format adaptable to the referencing side, and a referencing module for referencing the data value in a predetermined data format converted by the intermediate module, and which implements the publication and referencing process among the modules.

As the data value in the predetermined data format updated in the public file, a physical quantity, a data of a stored value used by CPU for internal computation with LSB information, or the like, is used. RAM etc., in the CPU circuit is used for constituting the public file.

BRIEF DESCRIPTION OF THE DRAWINGS

FIG. 5 shows another example of a process between the intermediate module and the referencing module, according to the present invention.

BEST MODE FOR CARRYING OUT THE INVENTION

Figure 2:
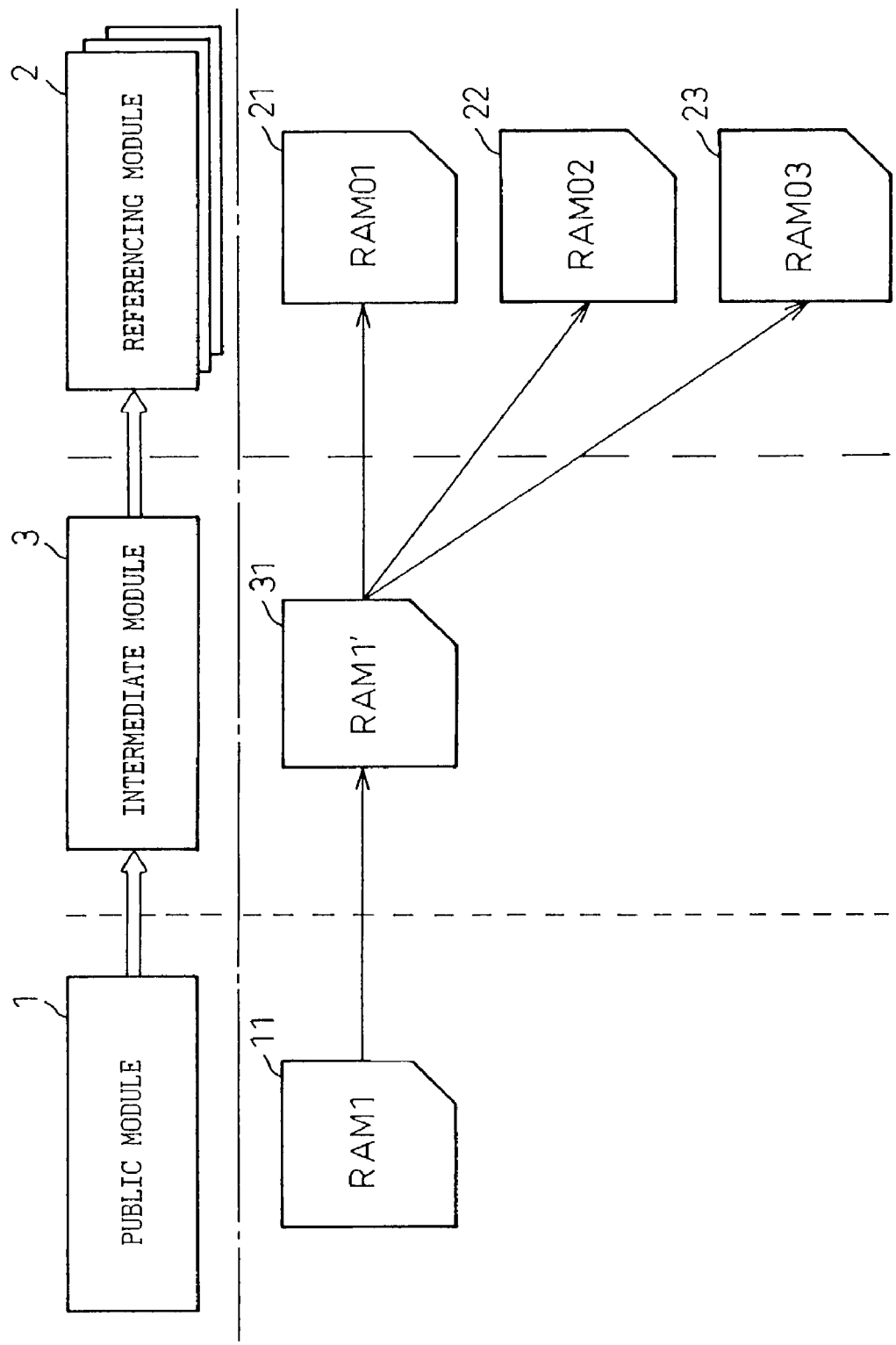
FIG. 2 shows an example of a basic structure of data publication and referencing between the integrated modules according to the present invention.

FIG. 2 shows an example of a basic structure of data publication/referencing between the integrated modules according to the present invention.

As shown in FIG. 2, according to the present invention, the intermediate module 3 is provided, between the conventional public module 1 and referencing module 2, to appropriately convert the data format of the public file 11 at the side of the public module 1 into the data format used at the side of the referencing module 2. At the side of the referencing module 2, by referencing the public file 31 after being converted by the intermediate module 3, the formally used data format can be used as-is. Then, it is possible to increase inheritance of the software and effectiveness in designing/developing the software.

The basic structure in FIG. 2 shows a conceptual structure of the present invention. Actually, the following various examples of structures can be considered. (1) As shown in the structure of FIG. 2, at first, the public module 1 updates its own public file 11. Next, the intermediate module updates the public file 31 by converting the data format of the public file 11 into a data format compatible to each referencing module which refers to the public file. Finally, the referencing module reads the corresponding data existing at a predetermined address, etc., and executes processing. (2) The public file 11 in FIG. 2 is omitted. The public module 1 directly updates the public file 31 of the intermediate module 3. The intermediate module 3 converts the contents of the updated public file 31 so as to be compatible to each referencing module, as in the above (1), or, upon receiving a referencing request from each referencing module 2, the intermediate module 3 appropriately converts the data format of the updated public file 31 into the compatible data format and transmits to the referencing module 2. (3) When small software parts, for each referencing module in the intermediate module 3, are previously embedded in each referencing module 2, the structure is the same as the above conventional examples and the object of increasing inheritance of software can be achieved. (4) In the above (1) to (3), a data format appropriate for each case, i.e., a data format requiring small memory amount and/or short processing time is adopted.

The above mentioned various structures are considered because it is necessary to use the small memory resource of the CPU circuit integrated in each product most effectively and to satisfy the real-time operation of processing demanded for the general integrated circuit. For example, in case of (1), the consumption of RAM becomes larger and the real-time property decreases because of the independent process of the intermediate module. However, because the intermediate module performs the converting process of all data formats, the inheritance of the software becomes better.

On the other hand, in case of (3), the consumption of ROM embedded in each referencing module becomes larger, and redesigning of the modules becomes necessary, with regard to the modules that need to refer the public data. (2) has a feature between (1) and (3). More concrete example of the present invention will be explained below using FIG. 3 to 5.

Figure 3:
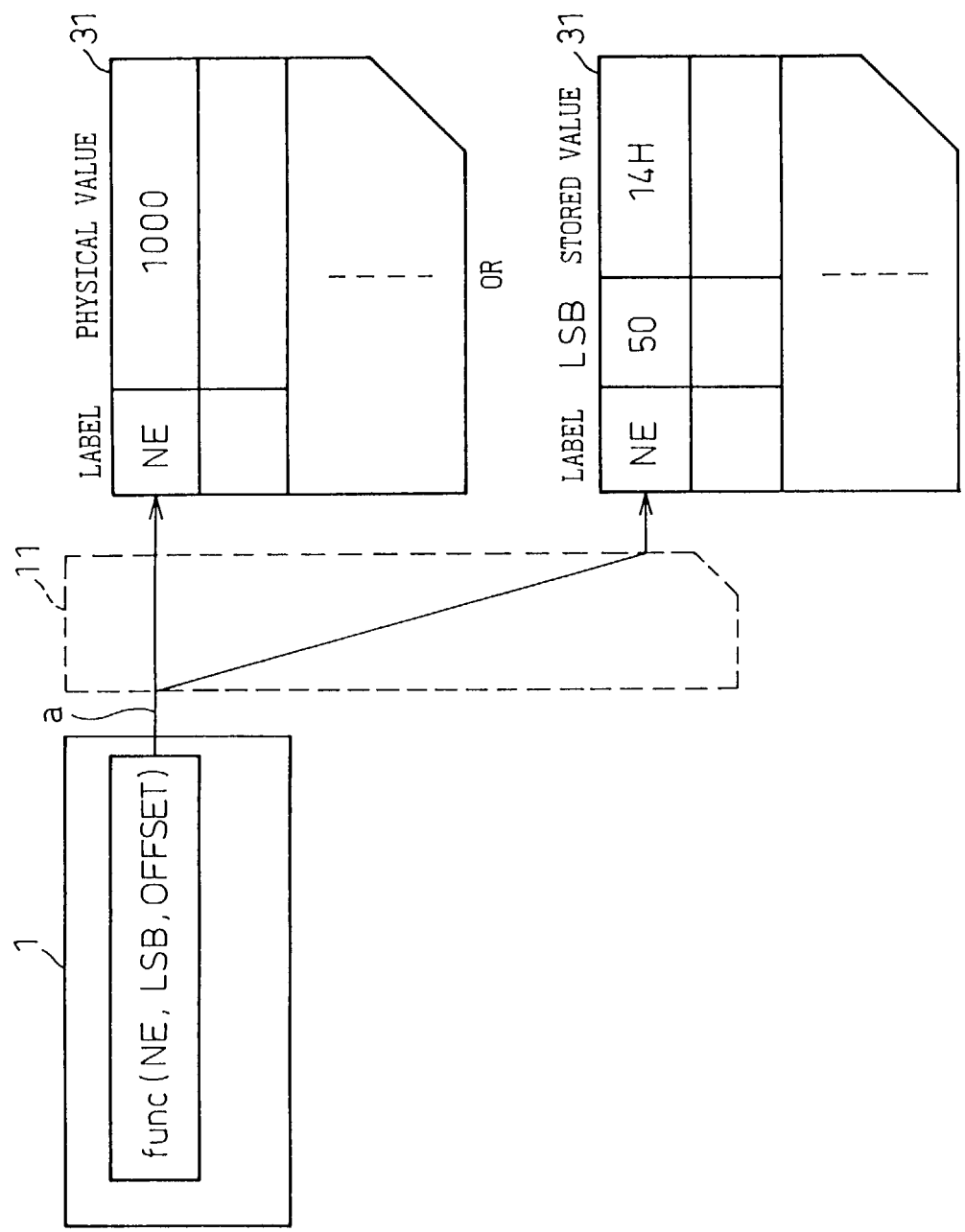
FIG. 3 shows an example of a process between the public module and the intermediate module, according to the present invention.
Figure 4:
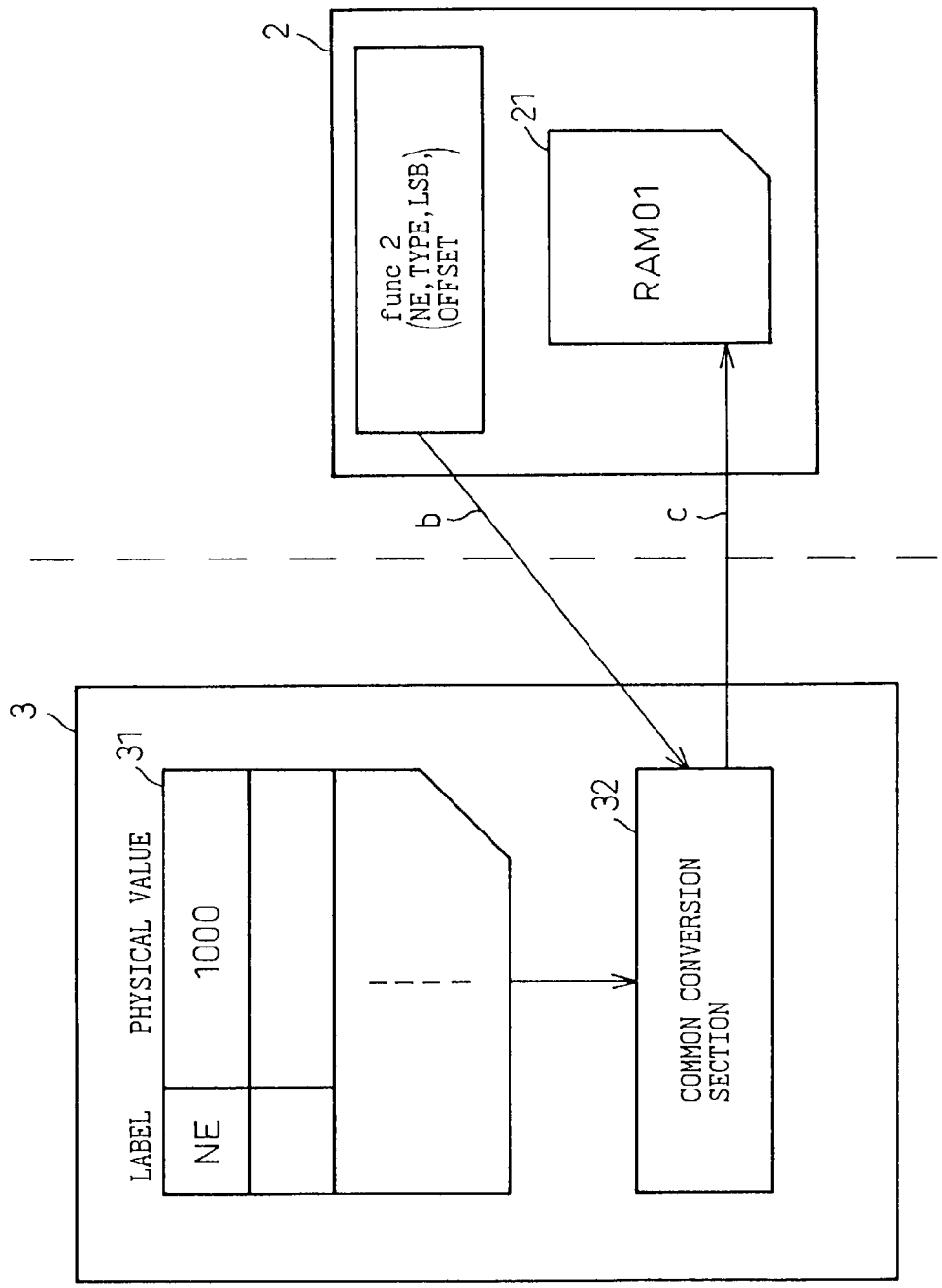
FIG. 4 shows an example of a process between the intermediate module and the referencing module, according to the present invention.
Figure 1:
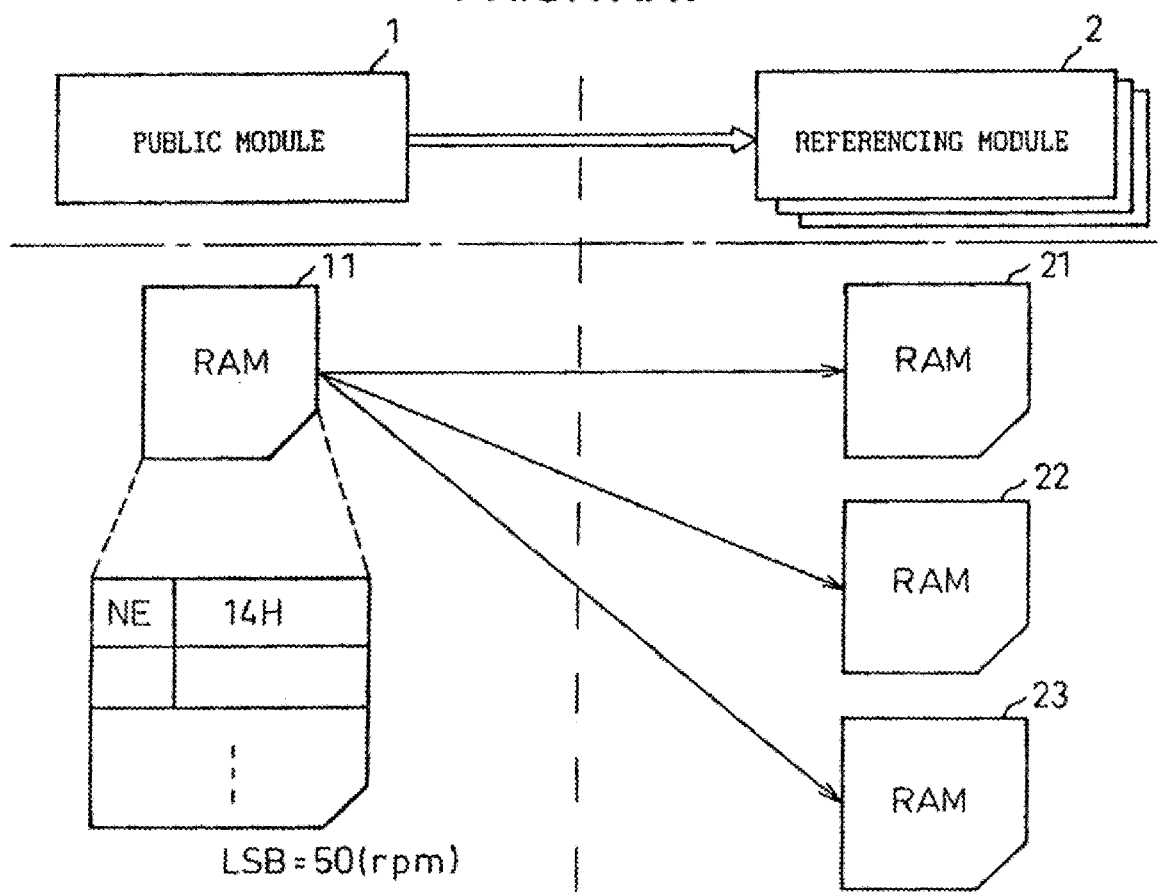

FIGS. 3 and 4 show an example of the structure of (1), (2) and (4) above. Here, the above-mentioned example of EFI-ECU is explained.

FIG. 3 shows an example of a process between the public module 1 and the intermediate module 3. The public module 1 detects the number of rotations of the engine (NE) of 1000 (rpm). In case of (1), the public module 1 updates its own public file 11 (illustrated by the dotted line). In case of (2), the public module 1 directly updates the public file 31 of the intermediate module 31 (a). Here, as is explained for the case of (4), two examples are shown, which are the case that the physical quantity of 1000 (rpm) is directly written as the updated data, and the case that data is written after being replaced to 1 byte of hexadecimal data (14 Hex).

In the former example, the concept of LSB is completely excluded and the data mismatch therefrom can be prevented from occurring. However, because the physical quantity is directly stored in RAM, there is a problem that the code generation becomes redundant and the processing time becomes longer, etc. For example, when the water temperature data=50.5 (°C.) and shown with a decimal point, 50.5 is stored in RAM with a floating-point. Thus, RAM is consumed and time for floating-point arithmetic is required.

On the other hand, in case of the latter, although the concept of LSB is succeeded, the LSB value, which was conventionally considered to be an artificial understanding, is added explicitly to each data. Accordingly, a hexadecimal data (Hex) can be used as before, which would guarantee the faster computing process. In the above mentioned example, by setting LSB=0.5 (°C.), 101 should be stored in RAM. However, in this case, RAM area increases corresponding to the amount of LSB information of each data. Which of the former and the latter should be adopted is determined based on the available RAM and necessary time for the computing process, etc.

FIG. 4 shows an example of processing between the intermediate module 3 and the referencing module 2. Here, the case in FIG. 3, that the physical quantity is written in the intermediate module 3, is shown. At first, each referencing module 2 transmits a request for referencing the public file 31 using a function, etc., to the intermediate module 3 (b). Upon receiving the referencing request, the intermediate module 3 converts the requested physical quantity 1000 by the internal common converting section 32 based on the information such as the data type, LSB, or the like, included in the function, into the conventional data format (for example, 14 Hex, etc.) required at the side of each referencing module. Then, the intermediate module 3 sends it back to the referencing module 2, from which the referencing request has been issued(c). It is apparent that this process can be similarly applied to the case in FIG. 3 where the LSB value is explicitly added to data.

As a result, the referencing module 2 can continue to use the existing module having no influence of the change in a variable at the side of the public module 1. The intermediate module 3 only processes a common data conversion for passing the data from the public module 1 to the referencing module 2, and the process can be performed by merely calling a C library function, etc. originally stored as a software library. Thus, the amount of ROM consumed for the intermediate module 3 is not especially increased.

FIG. 5 shows an example of a structure in case of (3) above. Here, the data with the LSB value in FIG. 3 is used in the intermediate module 3. In the present example, the function of the intermediate module 3 is embedded in each referencing module 2. The data read at the side of the referencing module 2 is converted, by the converting section 24 (corresponding to the intermediate module 3) individually provided for each module, into a data format required for the internal processing. This can also be performed by merely adding a small program which calls and executes the C library function, etc.

According to the present example, an increase in RAM use can be prevented compared to the above mentioned example, and a faster processing becomes possible because the module that needs a reference can directly refer the data with no intermediate processing of the referencing request. On the other hand, the inheritance of the software is degraded because the change of the referencing module becomes necessary and a normal operation test, etc., after the change is required.

As mentioned above, according to the present invention, unlike the prior art, a data mismatch existing between the module for updating the public file and the module for referencing it can be automatically solved without putting a load on a human, such as a user. Thus, the quality of the software as well as the productivity of the software can be increased.

Further, according to the present invention, the inheritance between the products, especially the products using integrated modules, is increased, and the software design/development becomes effective. Further, by applying the constitution of the present invention in an appropriately selected combination, effective use of the memory resource and the real-time property can be achieved at the same time.

The invention claimed is:

1. A system including memory and a control device for controlling a system component and resolving a mismatch of data formats used by the control device, the control device comprising:
   a public module for updating a public data value having a first predetermined data format;
   a first data store coupled to the public module the first data source storing the public data value in the first predetermined data format;
   an intermediate module for converting the public data value having the first predetermined data format into a data value having a second predetermined data format associated with a referencing side in response to a referencing request; and
   a referencing module for transmitting the referencing request, referencing the data value converted by the intermediate module, and generating an output to control the system in response;
   wherein the intermediate module includes a common converting section receiving the referencing request from the referencing module, the referencing request designating the second predetermined data format, the common converting section converting the public data value in the first predetermined data format into the data value in the second predetermined data format based on the referencing request and returning the converted data to the referencing module issuing the referencing request;
   whereby the publication and referencing process can be implemented among the modules.

2. The system according to claim 1, wherein the public module communicates with a random access memory (RAM).

3. The system of claim 1, wherein the control device is included in a vehicle and controls a vehicle component.

4. A system including memory and a control device, for controlling a system component and resolving a mismatch of data formats used by the control device, the control device comprising:
   a public module for updating a public data value having a first predetermined data format;
   a first data store coupled to the public module first data source storing the public data value in the first predetermined data format;
   an intermediate module for converting the public data value having the first predetermined data format into a data value having a second predetermined data format associated with a referencing side; and
   a referencing module for referencing the data value converted by the intermediate module and generating an output to control the system in response;
   wherein the intermediate module is embedded as a part of the referencing module, and the intermediate module converts the public data value in the first predetermined data format into the second predetermined data format associated with an internal process of the referencing module in response to the referencing module referencing the public data value in the first predetermined data format updated in the public module.

5. The system of claims 1 or 4, wherein the public data value in the first predetermined data format updated in the public module is a physical quantity.

6. The system of claims 1 or 4, wherein the public data value in the first predetermined data format updated in the public module is a data of a stored value with least significant bit (LSB) information.

7. The system of claim 4, wherein the control device is included in a vehicle and controls a vehicle component.

8. A system including memory and a control device, for controlling a system component and resolving a mismatch of data formats used by the control device, the control device comprising:
   a first module monitoring a status of the system and outputting a first value for indicating the monitored status;
   a first data store coupled to the first module, the first data store storing the first value in a first data format;
   a second module in communication with the first module, the second module receiving the first value and converting the first value into a second value having a second data format in response to a referencing request, the referencing request including least significant bit information for determining a least significant bit value for the first value;
   a second data store coupled to the second module, the second data store storing the second value and the determined least significant bit value; and
   a third module in communication with the second module, the third module transmitting the referencing request, receiving the second value and the determined least significant bit value from the second module, and generating an output to control the system in response.

9. The system of claim 8, wherein the control device is included in a vehicle and controls a vehicle component.

* * * * *

UNITED STATES PATENT AND TRADEMARK OFFICE
CERTIFICATE OF CORRECTION

PATENT NO. : 7,197,742 B2
APPLICATION NO. : 10/258304
DATED : March 27, 2007
INVENTOR(S) : Arita et al.

It is certified that error appears in the above-identified patent and that said Letters Patent is hereby corrected as shown below:

On the Title Page

| | |
|---|---|
| (56) References Cited<br>Other Publications<br>Niz et al, "Time weaver: A software through models. . . | Delete "embaded",<br>Insert --embedded-- |
| (56) References Cited<br>Other Publications, pg. 2, Col. 2, 1st Ref.<br>Hood et al, "Efficient recompilation of. . . | Delete "modeul interface ina sofwtare",<br>Insert --module interface in a software-- |
| (56) References Cited<br>Other Publications, pg. 2, Col. 2, 2nd Ref.<br>Wang et al, "An architecture for. . . | Delete "embadded software integration using resuable",<br>Insert --embedded software integration using reusable-- |

In the Drawings

Figure 1:
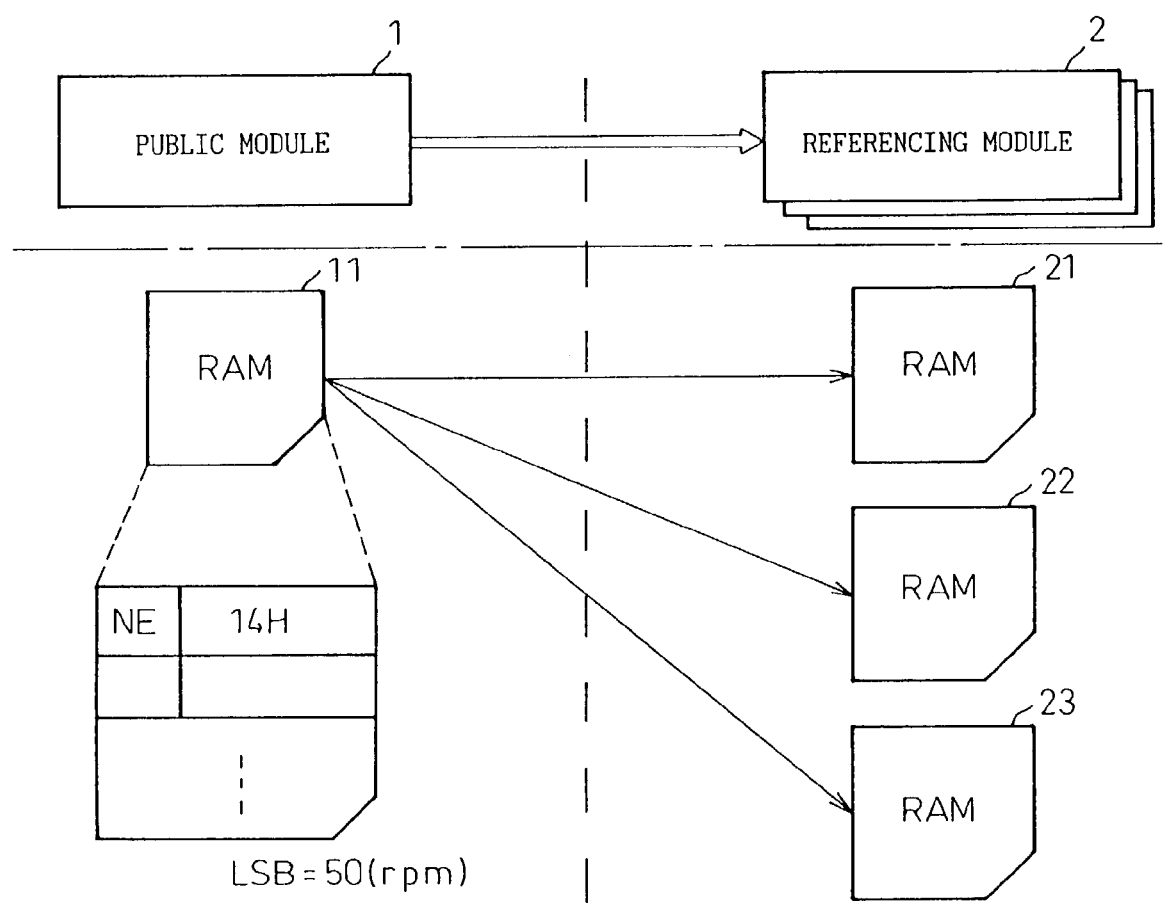
FIG. 1 shows an example of a structure of data publication and referencing between the conventional integrated modules.

| | |
|---|---|
| FIG. 1, Sheet 1 of 5 | Delete Drawing Sheet 1 and substitute therefore the Drawing Sheet, consisting of Fig. 1, as shown on the attached page |

In the Claims

| | |
|---|---|
| Column 5, line 44, Claim 1 | After "module", Insert --,-- |
| Column 6, line 6, Claim 4 | Delete "device,", Insert --device-- |
| Column 6, line 12, Claim 4 | After "module", Insert --, the-- |
| Column 6, line 30, Claim 5 | Delete "claims", Insert --claim-- |
| Column 6, line 33, Claim 6 | Delete "claims", Insert --claim-- |

UNITED STATES PATENT AND TRADEMARK OFFICE
CERTIFICATE OF CORRECTION

PATENT NO. : 7,197,742 B2
APPLICATION NO. : 10/258304
DATED : March 27, 2007
INVENTOR(S) : Arita et al.

It is certified that error appears in the above-identified patent and that said Letters Patent is hereby corrected as shown below:

Column 6, line 39, Claim 8          Delete "device,",
                                    Insert --device--

Signed and Sealed this

Eighth Day of July, 2008

JON W. DUDAS
*Director of the United States Patent and Trademark Office*